(12) United States Patent
Lang et al.

(10) Patent No.: US 9,716,413 B2
(45) Date of Patent: Jul. 25, 2017

(54) ELECTRIC MACHINE STATOR WITH RADIAL VENT

(71) Applicants: Nicholas G. Lang, Cincinnati, OH (US); Tyler Gaerke, Cincinnati, OH (US); Michael A. Graman, Cincinnati, OH (US)

(72) Inventors: Nicholas G. Lang, Cincinnati, OH (US); Tyler Gaerke, Cincinnati, OH (US); Michael A. Graman, Cincinnati, OH (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 966 days.

(21) Appl. No.: 14/037,672

(22) Filed: Sep. 26, 2013

(65) Prior Publication Data

US 2015/0084457 A1 Mar. 26, 2015

(51) Int. Cl.
*H02K 1/32* (2006.01)
*H02K 1/26* (2006.01)
*H02K 15/02* (2006.01)

(52) U.S. Cl.
CPC .............. *H02K 1/32* (2013.01); *H02K 1/26* (2013.01); *H02K 15/024* (2013.01); *Y10T 29/49009* (2015.01)

(58) Field of Classification Search
CPC ...................................................... H02K 1/32
USPC ....................................................... 310/64, 65
See application file for complete search history.

(56) References Cited

U.S. PATENT DOCUMENTS

| 3,171,996 A * | 3/1965 | Alger ................. H02K 1/20 310/51 |
| 2003/0075996 A1* | 4/2003 | Yoshida ............ H02K 1/20 310/58 |

\* cited by examiner

*Primary Examiner* — Terrance Kenerly

(57) ABSTRACT

An electric machine stator is provided and includes laminations consolidated along an axial direction to form a core element such that the core element includes an end lamination at an axial end of the core element. The end lamination includes a body extending in a plane and a plurality of spacer protrusions protruding along the axial direction from the plane. Each of the spacer protrusions of the plurality of spacer protrusions is configured for consolidation with another core element to define a radial vent between the core element and the another core element.

17 Claims, 5 Drawing Sheets

ELECTRIC MACHINE STATOR WITH RADIAL VENT

BACKGROUND OF THE INVENTION

The subject matter disclosed herein relates to an electric machine and, more particularly, to an electric machine stator with a radial vent formed by a core lamination.

In electric machines, a stator is normally formed to define a bore in which a rotor is rotatably supported. The stator includes conductive elements provided as stator windings. The rotor includes a squirrel cage or an amortisseur winding such that rotation of the rotor within the bore while an excitation current is applied to the stator windings can generate current in the conductive elements, which are disposed to extend through the stator when the electric machine is run in a generator mode. By contrast, current applied to such conductive elements can interact with the squirrel cage or amortisseur winding and thereby cause the rotor to rotate in a motor mode.

During operation of the electric machine in either the generator or motor mode, a large amount of heat can be generated in various elements. This heat can lead to damage to motor components, the stator or the rotor but primarily to stator winding insulation if the heat is not removed or the heated elements are not otherwise cooled. One way to remove heat and to cool the various elements in an electric machine is to form cooling paths through the stator and/or the rotor by which coolant, such as ambient air, is directed through or across heat generating parts, such as the conductive elements. One type of such cooling or ventilations paths is a radial vent that is defined between adjacent core elements.

Typically, radial vents are formed by radial vent spacers that are positioned between core elements. These radial vent spacers have predefined widths defined along a longitudinal axis of the core elements that define a corresponding width of the radial vents. The radial vent spacers are commonly manufactured as a weldment, for example, or another type of a multiple piece assembly. However, it can be difficult to provide such components in appropriate sizes and shapes, fabrication is time consuming and can be prone to manual error.

BRIEF DESCRIPTION OF THE INVENTION

According to one aspect of the invention, an electric machine stator core is provided and includes laminations consolidated along an axial direction to form a core element such that the core element includes an end lamination at an axial end of the core element. The end lamination includes a body extending in a plane and a plurality of spacer protrusions protruding along the axial direction from the plane. Each of the spacer protrusions of the plurality of spacer protrusions configured for consolidation with another core element to define a radial vent between the core element and the another core element.

According to another aspect of the invention, a stator of an electric machine stator is provided and includes first laminations consolidated along an axial direction to form a first core element and second laminations consolidated along the axial direction to form a second core element. The first and second core elements are disposable such that a first end lamination of the first core element faces a second end lamination of the second core element. The first end lamination includes a body extending in a plane and a plurality of spacer protrusions protruding along the axial direction from the plane. Each spacer protrusion of the plurality of spacer protrusions is configured for consolidation with the second end lamination.

According to yet another aspect of the invention, a method of assembling an electric machine stator is provided. The method includes consolidating first and second laminations along an axial direction to form first and second core elements, respectively, such that a first end lamination of the first core element faces a second end lamination of the second core element, forming the first end lamination to include a body extending in a plane and a plurality of spacer protrusions protruding along the axial direction from the plane and consolidating the plurality of spacer protrusions with the second end lamination along the axial direction.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

An electric machine is provided and includes a stator having a radial vent defined by a vent spacer formed from a thin sheet that may be part of a laminated core. In forming the radial spacer in this manner, effort and manufacturing time, as well as manufacturing variability can be reduced. The sheet may be stamped in a single motion or formed progressively in multiple operations accommodated by high speed stamping processes. The sheet, once stamped, is cut and slit or sheared and then folded to form a spacing projection while additional contours for strength and rigidity may also be formed. These processes can be done by the stamping machine or at the same time as the stamping.

Due to the use of the sheet to form the radial vent, a cross-sectional area of the radial vent can be increased relative to a radial vent formed using a radial vent spacer. This will reduce restrictions to airflows and allow the electric machine to run cooler, have increased power output and/or be reduced in overall size or cost.

Figure 1:
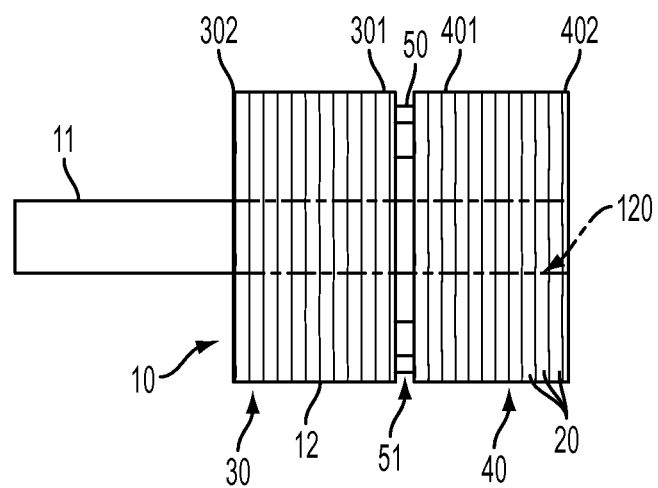
FIG. 1 is a radial view of an electric machine in accordance with embodiments.
Figure 2:
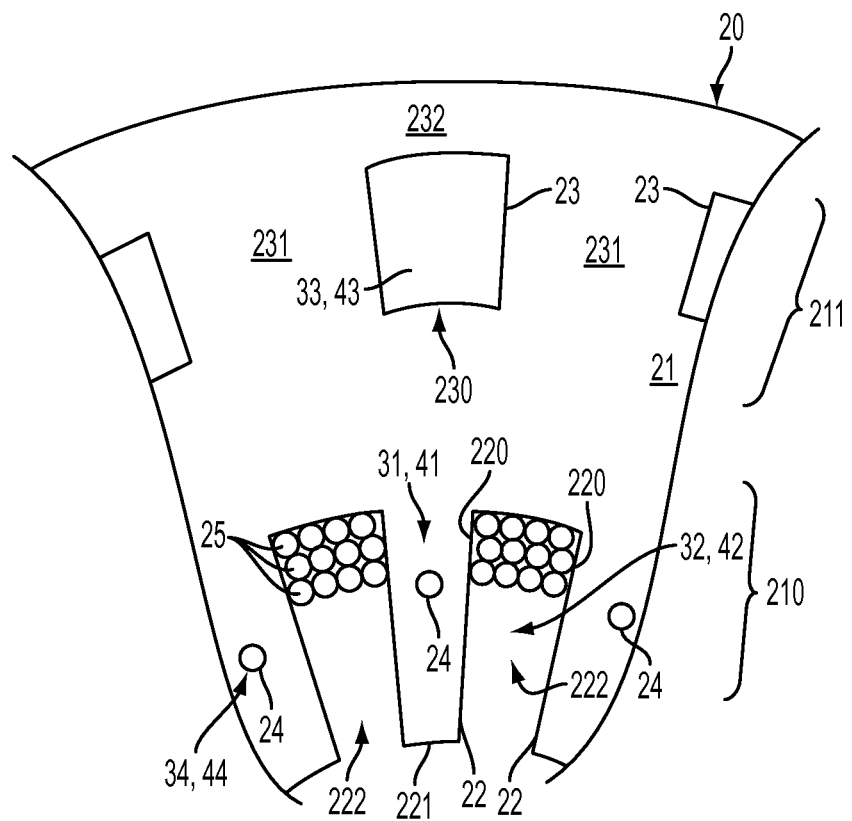
FIG. 2 is an axial view of a portion of a lamination of the electric machine of FIG. 1.
Figure 3:
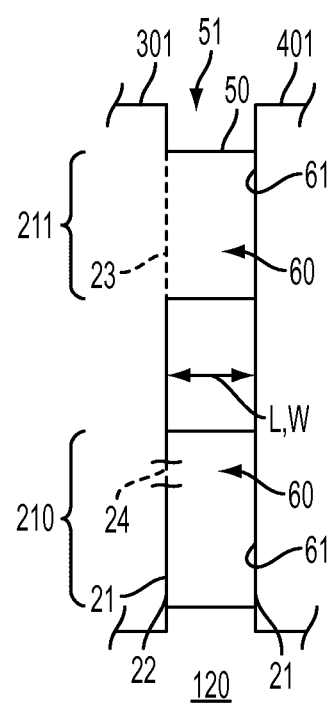
FIG. 3 is an enlarged radial view of a portion of the electric machine of FIG. 1.

With reference to FIGS. 1-3, an electric machine 10 is provided and includes a rotor 11 and a stator 12. The stator 12 is formed to define a bore 120 in which the rotor 11 is rotatably supportable. Rotation of the rotor 11 within the bore 120 can generate flux that induces current in conductive elements (not shown), which are disposed to extend through the stator 12, when the electric machine 10 is operated in a generator mode. By contrast, current applied to the conductive elements can cause the rotor 11 to rotate when the electric machine 10 is operated in a motor mode.

The stator 12 is formed of a plurality of laminations 20. Each lamination 20 is formed from a relatively thin piece of sheet metal that is punched (or otherwise cut) into shape and then consolidated with at least one or two adjacent and substantially similarly shaped and sized laminations. The consolidating is achieved by an application of heat and pressure in accordance with various known methods. With enough laminations 20 consolidated together, a first group of laminations 20 may be consolidated with another along an axial direction to form at least a first core element 30 and a second group of laminations 20 may be consolidated with one another along the axial direction to form at least a second core element 40. The first and second core elements 30 and 40 may be separated from one another by a spacer 50 that is formed to define a radial vent 51.

More particularly, the first core element 30 may include a series of axially sequential consolidated laminations 20 with a first end lamination 301 at one axial end of the first core element 30 and another end lamination 302 at the opposite axial end of the first core element 30. Similarly, the second core element 40 may include a series of axially sequential consolidated laminations 20 with a second end lamination 401 at one axial end of the second core element 40 and another end lamination 402 at the opposite axial end of the second core element 40. The first and second core elements 30 and 40 are disposable along the axial direction such that the first end lamination 301 of the first core element 30 faces the second end lamination 401 of the second core element 40 in the axial direction.

As shown in FIG. 2, each of the laminations 20 of the first and second core elements 30 and 40 includes a body 21 that extends in a planar dimension transversely oriented relative to the axial direction. The body 21 has an inner diameter region 210 and an outer diameter region 211. At the inner diameter region 210, each of the laminations 20 includes an annular array of teeth 22 and, at the outer diameter region 211, each of the laminations 20 is formed to define an annular array of vents 23. In addition, each lamination 20 is further formed to define a vent feature 24 at a central region of each tooth 22 of the annular array of teeth 22.

In accordance with embodiments, each tooth 22 of the annular array of teeth 22 includes a pair of radial sidewalls 220 and a circumferential sidewall 221. The radial sidewalls 220 each extend radially inwardly toward the bore 120 and respectively face complementary radial sidewalls 220 of adjacent teeth 22 in the circumferential direction. The circumferential sidewall 221 connects with distal ends of the radial sidewalls 220 and is crowned to define an annular shape with the other circumferential sidewalls 221. With this configuration, the annular array of teeth 22 defines an annular array of conductive element regions 222, which are interleaved with the annular array of teeth 22. That is, each pair of adjacent teeth 22 defines a conductive element region 222 between the complementary radial sidewalls 220.

Each vent 23 in the annular array of vents 23 is defined by the lamination 20 and may have varying shapes and sizes. For example, each vent 23 may have a crowned trapezoidal shape 230. In this case, the lamination 20 includes spoke portions 231 between adjacent vents 23 and a rim portion 232 at an outer diameter of the lamination 20. The spoke portions 231 may each have substantially uniform circumferential thicknesses. The rim portion 232 may have a substantially uniform radial thickness.

The vent feature 24 may be defined between the radial sidewalls 220 of each tooth 22 in the circumferential direction and at a radial mid-point of each tooth 22. The vent feature 24 may have various shapes and sizes including, but not limited to, circular or elliptical shapes.

Although each of the teeth 22, each of the conductive element regions 222, each of the vents 23 and each of the vent features 24 are described above as having respectively similar shapes, sizes and positions, it is to be understood that this is not required and that other configurations are possible. For example, some teeth 22 may be wider or longer than others, some of the vents 23 may have different shapes from other vents 23 and the vent features 24 can be staggered at varying radial locations of the corresponding teeth 22. In each case, the configurations of the above-noted components can be determined in accordance with ease of manufacturability, costs and/or local conditions within the electric machine 10.

When the laminations 20 are consolidated to form the first core element 30 and the second core element 40, the annular arrays of each lamination 20 in each core element line up. Thus, the first core element 30 includes a first annular array of axial teeth formations 31, a first annular array of axial conductive element regions 32, a first annular array of axial vents 33 and a first annular array of axial vent features 34. Similarly, the second core element 30 includes a second annular array of axial teeth formations 41, a second annular array of axial conductive element regions 42, a second annular array of axial vents 43 and a second annular array of axial vent features 44.

The conductive elements 25 can be supportively disposed around the first and second annular arrays of teeth formations 31 and 41 such that they extend through the first and second annular arrays of conductive element regions 32 and 42 in a number of stator 12 windings that is determined in accordance with design characteristics of the electric machine 10. The conductive elements 25 may be formed of a plurality of copper strands or a plurality of strands of another similarly conductive material. The strands are arranged in one or more columns in the first and second annular arrays of axial conductive element regions 32 and 42 and have a current carrying capacity in accordance with design parameters. A layer of electrical insulation may be provided to surround each individual strand to thereby electrically insulate that strand from adjacent strands in the column or in adjacent columns.

The electrical insulation surrounding each of the strands may be formed of a high thermal conductivity composite including one or more of polymers/resins, high thermal conductivity fillers and structural reinforcement materials such as E, S or S2 glass fibers, polyester fibers, Kevlar fibers or a like reinforcement material. Fillers made of boron nitride having cubic or hexagonal crystal structure or silica may be used. In this manner, heat transfer from each of the strands through the insulation is improved resulting in reduction of localized hot spot temperatures within individual strands and increased heat removal through axial teeth formation and axial vents (to be described below).

The conductive elements 25 may be connected or otherwise coupled to an electrical grid for providing alternating current to the grid. That is, when the electric machine 10 is operating in the above-noted generator mode, the electric machine converts mechanical energy embodied as a rotation of the rotor 11 to electrical energy by means of electromagnetic induction. In addition, the rotor 11 may also be connected to a grid, for example, in case of a doubly fed generator. The conductive elements 25 may also be wired with one another and with an external circuit so as to provide the stator 12 with a wiring configuration of a predefined or desired number of poles. As an example, the wiring configuration may be that of a 6-pole wiring configuration.

The first and second annular arrays of axial vents 33 and 43 and the first and second annular arrays of axial vent features 34 and 44 extend axial along the respective lengths of the first and second core elements 30 and 40, respectively, and fluidly communicate with the radial vent 51. As such, coolant may be directed to flow radially outwardly from the rotor 11 by the rotation of the rotor 11 and into the radial vent 51 whereupon a portion of the coolant flows through the axial vents 33 and axial vent features 34 and another portion of the coolant flows through the axial vents 43 and the axial vent features 44. Alternatively, coolant may be directed to flow from an exterior of the electric machine 10 into and through the axial vents 33 and the axial vent features 34, into the radial vent 51 and, from the radial vent 51, into and out of the axial vents 43 and the axial vent features 44 to the exterior of the electric machine 10. The coolant may be at least one or more of ambient air, conditioned air, water and/or transmission oil.

The first end lamination 301 is formed to have a similar configuration as the other laminations 20 described above. That is, the first end lamination 301 includes a body 21 that extends in a planar dimension transversely oriented relative to the axial direction. The body 21 has an inner diameter region 210 and an outer diameter region 211. At the inner diameter region 210, the first end lamination 301 includes an annular array of teeth 22 and, at the outer diameter region 211, the first end lamination 301 is formed to define an annular array of vents 23. The first end lamination 301 is further formed to define a vent feature 24 at a central region of each tooth 22 of the annular array of teeth 22.

With reference to FIGS. 3-6, the first end lamination 301 additionally includes a plurality of spacer protrusions 60. The spacer protrusions 60 protrude along the axial direction from the plane of the body 21 of the first end lamination 301 and include distal portions 61 that are configured to be consolidated with corresponding portions of the body 21 of the second end lamination 401. As such, the spacer protrusions 60 are configured to perform as the spacer 50 and thus define the radial vent 51 between the first and second core elements 30 and 40. As such, a length L of the spacer protrusions 60 as measured from the plane of the body 21 defines an axial width W of the radial vent 51.

In accordance with embodiments, a number of the spacer protrusions 60 and their respective sizes and shapes are defined such that the spacer protrusions 60 resist buckling under the applied pressures during the consolidating operations.

Figure 4:
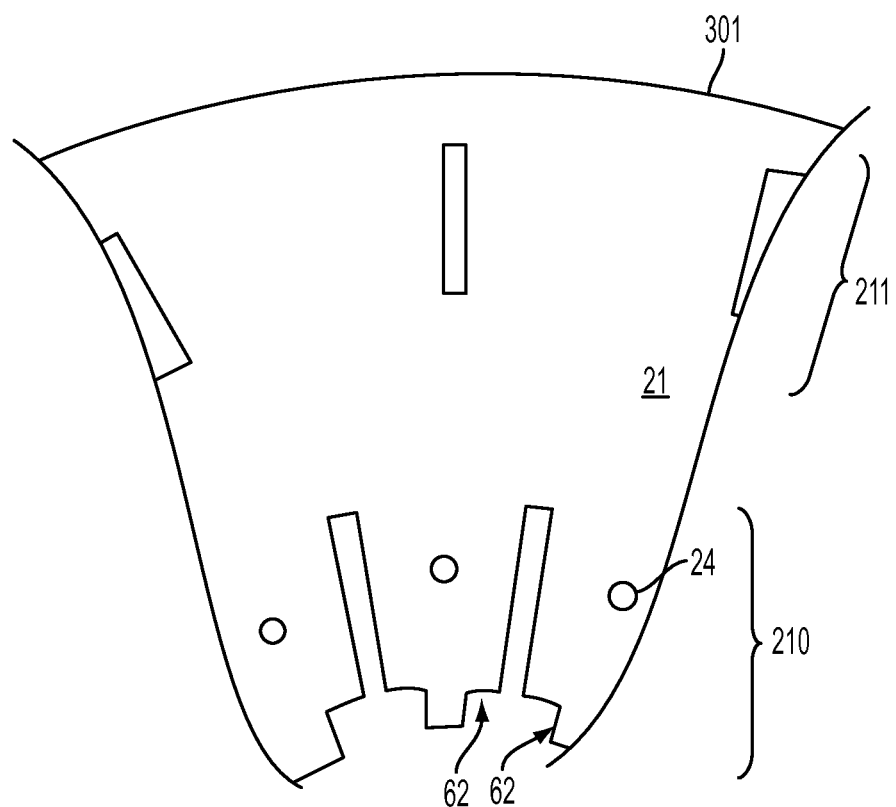
FIG. 4 is an axial view of a portion of an end lamination of the electric machine of FIG. 1 at an initial stage of assembly.
Figure 5:
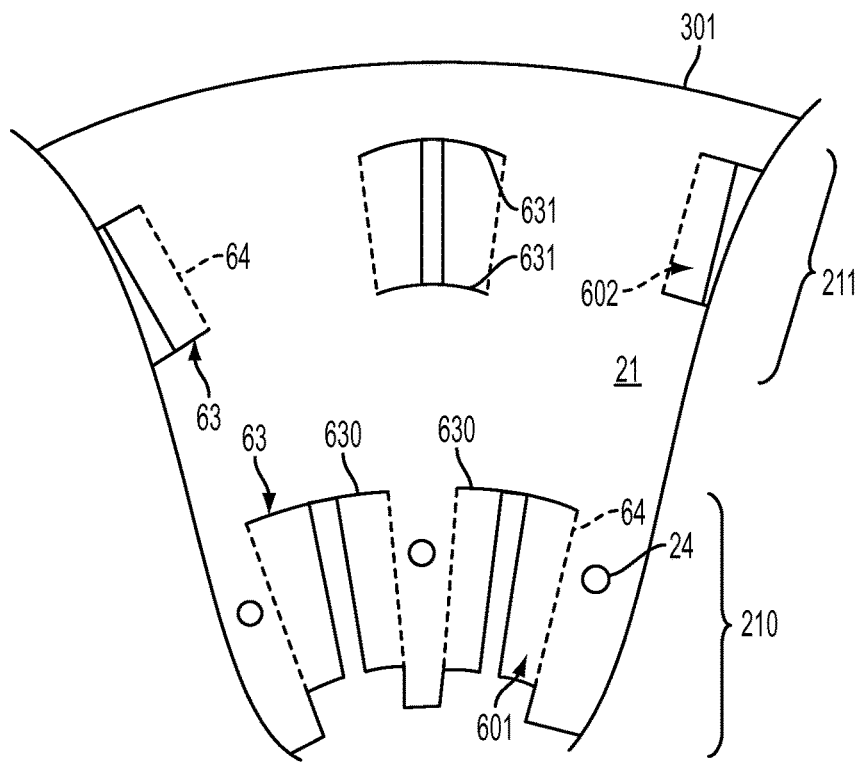
FIG. 5 is a perspective view of a portion of the end lamination of FIG. 4 at an intermediate stage of assembly.

As shown in FIGS. 2-6, formation of the spacer protrusions 60 initially includes forming the first end lamination 301 with notches 62 at corners defined by future locations of the radial sidewalls 220 and the circumferential sidewalls 221 (see FIGS. 2 and 4). Next, the formation of the spacer protrusions 60 includes cutting, slitting or shearing a material of the body 21 along release regions 63 (see FIG. 5). The release regions 63 may include first release regions 630 and second release regions 631. The first release regions 630 may be defined at radially outward ends of the radial sidewalls 220 and have a length in a circumferential direction that is similar to that of the corresponding notch 62 (and the desired width of the radial vent 51). Each pair of corresponding notch 62 and first release region 630 thus defines a flap of material forming a first spacer protrusion 601. The second release regions 631 may be defined at radially inward and outward ends of the vents 23 and have substantially similar circumferential lengths (which are also similar to the desired width of the radial vent). Each pair of corresponding second release regions 631 thus defines a flap of material forming a second spacer protrusion 602. Finally, the flaps of material forming the first spacer protrusions 601 and the flaps of material forming the second spacer protrusions 602 are folded in the same direction along creases 64 (see FIG. 6) such that the distal portions 61 of each first and second spacer protrusion 601 and 602 are positioned at a similar axial distance from the body 21 (i.e., length L or width W).

In accordance with embodiments the first spacer protrusions 601 have similar dimensions with respect to one another, the second spacer protrusions 602 have similar dimensions with respect to one another and the first and second spacer protrusions 601 and 602 respectively form first and second annular arrays of first and second spacer protrusions 601 and 602. However, it is to be understood that this configuration is not required and that other configurations are possible. For example, some of the first spacer protrusions 601 can be staggered at various radial locations or have varying radial lengths. Similarly, some of the second spacer protrusions 602 can be staggered at various radial locations or have varying radial lengths.

Figure 6:
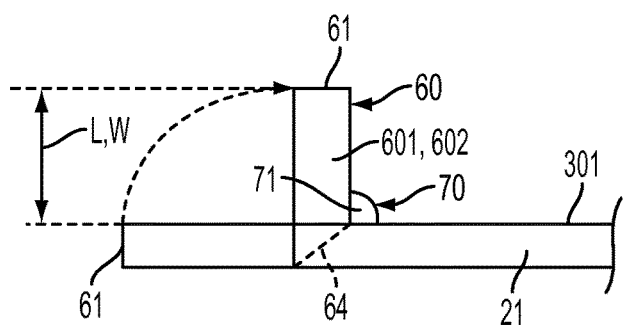
FIG. 6 is a side view of a portion of the end lamination of FIGS. 4 and 5 at a late stage of assembly.

In accordance with further embodiments and, as shown in FIG. 6, the first end lamination 301 may further include a surface strengthening feature 70. The surface strengthening feature 70 may be provided as a gusset 71 or surface abnormality at an interface between the body 21 and a spacer protrusion 60. In some cases, the surface strengthening feature 70 may be plural in number and disposed in multiples at each of the teeth 22 and the axial vents 23. The surface strengthening feature 70 may increase the capacity of the spacer protrusions 60 to further resist the buckling.

Figure 7:
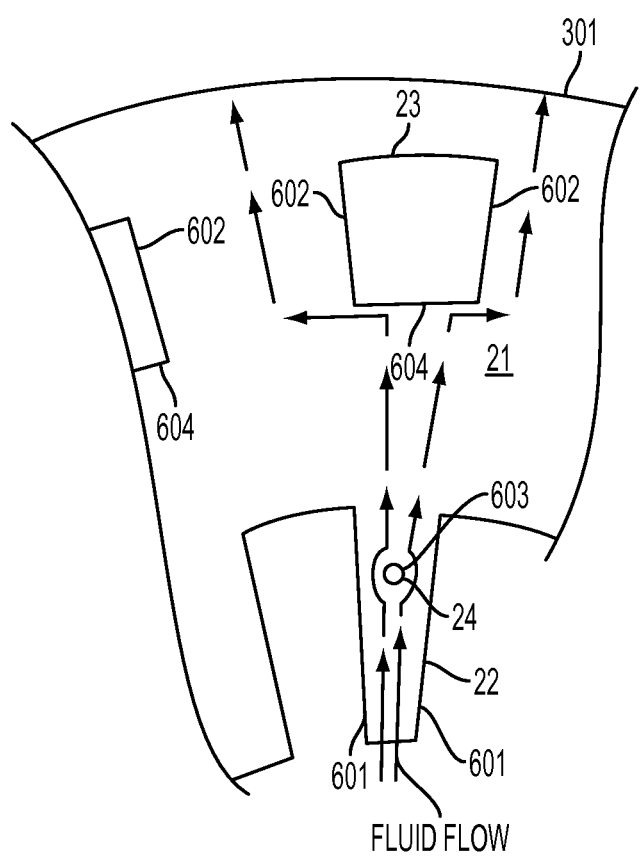
FIG. 7 is a perspective view of a portion of the end lamination of FIGS. 4 and 5 at a late stage of assembly in accordance with further embodiments.

With reference to FIG. 7, the first end lamination 301 may be formed with the first and second spacer protrusions 601 and 602 as well as additional aerodynamic features. These additional aerodynamic features may include ridges 603 disposed around the vent features 24 and additional spacer protrusions 604. The ridges 603 can interfere with the flow of fluid in the radial direction. Such interference can generated a turbulent fluid flow in the radial vent 51 that increases a degree of local heat removal. The ridges 603 may also be employed to locate each of the laminations 20 in their respective proper positions relative to neighboring laminations 20. The additional spacer protrusions 604 may be disposed to create a torturous path for fluid flow through the radial vent 51. For example, in an embodiment in which the axial vents 33 and 43 are circumferentially aligned with the teeth 22, the additional spacer protrusions 604 may be disposed at a circumferential edge of the axial vents 23. In this case, fluid flow in the radial vent 51 may be directed radially outwardly from the rotor 11 along the teeth 22 (i.e., between adjacent ones of the first spacer protrusions 601), circumferentially by the additional spacer protrusions 604 and then radially outwardly along the outer diameter region 211 (i.e., between adjacent ones of the second spacer protrusions 602).

In accordance with further aspects of the invention and, as shown in FIGS. 3-7, a method of assembling the stator 12 of the electric machine 10 is provided. The method includes consolidating first and second laminations along an axial direction to form first and second core elements 30 and 40, respectively, such that a first end lamination 301 of the first core element 30 faces a second end lamination 401 of the second core element 40. The method further includes forming the first end lamination 301 to include a body 21 extending in a plane and a plurality of spacer protrusions 60 protruding along the axial direction from the plane and consolidating the plurality of spacer protrusions 60 with the second end lamination 401 along the axial direction. In accordance with embodiments, the forming of the first end lamination 301 includes forming the first end lamination 301 to have a number of spacer protrusions 60 sufficient to resist buckling under or associated with the consolidating.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An electric machine stator, comprising:
   laminations consolidated along an axial direction to form a core element such that the core element includes an end lamination at an axial end of the core element,
   the end lamination comprising:
      a body extending in a plane; and
      a plurality of spacer protrusions protruding along the axial direction from the plane, the plurality of spacer protrusions being configured for consolidation with another core element to define a radial vent between the core element and the another core element,
      wherein each spacer protrusion comprises flaps of material that are folded along creases to define the radial vent between the core element and the another core element.

2. The electric machine stator according to claim 1, wherein a length of the spacer protrusions defines a width of the radial vent along the axial direction.

3. The electric machine stator according to claim 1, wherein the radial vent defines a torturous path from an inner diameter thereof to an outer diameter thereof.

4. The electric machine stator according to claim 1, wherein each of the laminations includes an annular array of teeth at respective inner diameters thereof and is formed to define an annular array of vents at respective outer diameters thereof.

5. The electric machine stator according to claim 4, wherein each of the laminations is further formed to define a vent feature at each tooth of the annular array of teeth.

6. The electric machine stator according to claim 4, wherein the spacer protrusions comprise:
   first spacer protrusions disposed at each of the teeth of the annular array of teeth; and
   second spacer protrusions disposed at each of the vents of the annular array of vents.

7. The electric machine stator according to claim 6, wherein the first spacer protrusions have similar dimensions, the second spacer protrusions have similar dimensions and the first and second spacer protrusions form first and second annular arrays of first and second spacer protrusions, respectively.

8. The electric machine stator according to claim 1, wherein the end lamination further comprises a surface strengthening feature at an interface between the body and a spacer protrusion.

9. A stator of an electric machine, comprising:
   first laminations consolidated along an axial direction to form a first core element; and
   second laminations consolidated along the axial direction to form a second core element,
   the first and second core elements being disposable such that a first end lamination of the first core element faces a second end lamination of the second core element,
   the first end lamination comprising a body extending in a plane and a plurality of spacer protrusions protruding along the axial direction from the plane, the plurality of spacer protrusions being configured for consolidation with the second end lamination to define a radial vent between the first core element and the second core element,
   wherein each spacer protrusion comprises flaps of material that are folded along creases to define the radial vent between the first core element and the second core element.

10. The stator according to claim 9, wherein a length of the spacer protrusions defines a width of the radial vent along the axial direction.

11. The stator according to claim 9, wherein the radial vent defines a torturous path from an inner diameter thereof to an outer diameter thereof.

12. The stator according to claim 9, wherein each of the first and second laminations includes an annular array of teeth at respective inner diameters thereof and is formed to define an annular array of vents at respective outer diameters thereof.

13. The stator according to claim 12, wherein each of the first and second laminations is further formed to define a vent feature at each tooth of the annular array of teeth.

14. The stator according to claim 12, wherein the spacer protrusions of the first end lamination comprise:
   first spacer protrusions disposed at each of the teeth of the annular array of teeth; and
   second spacer protrusions disposed at each of the vents of the annular array of vents.

15. The stator according to claim 14, wherein the first spacer protrusions have similar dimensions, the second spacer protrusions have similar dimensions and the first and second spacer protrusions form first and second annular arrays of first and second spacer protrusions, respectively.

16. The stator according to claim 9, wherein the first end lamination further comprises a surface strengthening feature at an interface between the body and a spacer protrusion.

17. The stator according to claim 9, wherein a number of the spacer protrusions is sufficient to resist buckling under a consolidating pressure of the first and second laminations.

* * * * *